(12) United States Patent
Ikemiya et al.

(10) Patent No.: US 8,366,222 B2
(45) Date of Patent: Feb. 5, 2013

(54) CONTAINER REFRIGERATION UNIT

(75) Inventors: Makoto Ikemiya, Osaka (JP); Takayuki Uo, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 423 days.

(21) Appl. No.: 12/672,204

(22) PCT Filed: Aug. 7, 2008

(86) PCT No.: PCT/JP2008/002160
§ 371 (c)(1),
(2), (4) Date: Feb. 4, 2010

(87) PCT Pub. No.: WO2009/019884
PCT Pub. Date: Feb. 12, 2009

(65) Prior Publication Data
US 2011/0148266 A1 Jun. 23, 2011

(30) Foreign Application Priority Data
Aug. 7, 2007 (JP) .................................. 2007-205705

(51) Int. Cl.
*A47B 96/04* (2006.01)
(52) U.S. Cl. .................... 312/406.2; 312/406; 312/401
(58) Field of Classification Search ............ 62/407, 62/440, 259.1; 312/401, 406, 116, 257.1, 312/236, 263, 406.2; 220/501, 507, 592.03, 220/592.02
See application file for complete search history.

(56) References Cited

U.S. PATENT DOCUMENTS

| | | | | |
|---|---|---|---|---|
| 2,579,396 A | * | 12/1951 | Philipp | 228/141.1 |
| 3,707,243 A | * | 12/1972 | Kitson | 220/592.1 |
| 4,116,507 A | * | 9/1978 | Marusiak, Jr. | 312/210 |
| 4,744,225 A | * | 5/1988 | Shoji et al. | 62/239 |
| 4,920,696 A | * | 5/1990 | Mawby et al. | 312/404 |
| 5,501,076 A | * | 3/1996 | Sharp et al. | 62/3.6 |
| 5,669,232 A | * | 9/1997 | Iwamoto et al. | 62/296 |
| 6,773,082 B2 | * | 8/2004 | Lee | 312/401 |
| 2004/0040338 A1 | * | 3/2004 | Lee et al. | 62/441 |
| 2005/0257552 A1 | * | 11/2005 | Yun et al. | 62/295 |
| 2008/0180010 A1 | * | 7/2008 | Iguchi et al. | 312/401 |
| 2009/0151379 A1 | * | 6/2009 | Ishihara | 62/259.1 |
| 2010/0192620 A1 | * | 8/2010 | Ikemiya et al. | 62/440 |
| 2010/0205999 A1 | * | 8/2010 | Ikemiya et al. | 62/440 |
| 2011/0148266 A1 | * | 6/2011 | Ikemiya et al. | 312/401 |

FOREIGN PATENT DOCUMENTS

| | | | |
|---|---|---|---|
| JP | 58-20190 U | | 2/1983 |
| JP | 06094355 A | * | 4/1994 |

(Continued)

*Primary Examiner* — James O Hansen
*Assistant Examiner* — Daniel Rohrhoff
(74) *Attorney, Agent, or Firm* — Birch, Stewart, Kolasch & Birch, LLP

(57) ABSTRACT

A container refrigeration unit mounted on a container body (1*a*) includes a casing body (11) partitioning the container into the internal side and the external side thereof. A protruding portion (12) protruding toward the internal side is formed in a lower portion of the casing body (11), and the side stays (50) each extending vertically are mounted on both sides of the rear surface of the protruding portion (12). On the contrary, evaporator frames (40) each located above the protruding portion (12) and extending from the casing body (11) to a top end of the side stay (50) are mounted on both sides of an upper portion of a rear surface in the casing body (11). The bottom tip of the side frame (40) and the top end of the side stay (50) are fixed by a bolt.

6 Claims, 6 Drawing Sheets

FOREIGN PATENT DOCUMENTS

| | | |
|---|---|---|
| JP | 8-337287 A | 12/1996 |
| JP | 9-24990 A | 1/1997 |
| JP | 10-132452 A | 5/1998 |
| JP | 11-14243 A | 1/1999 |

\* cited by examiner

FIG. 8 "PRIOR ART"
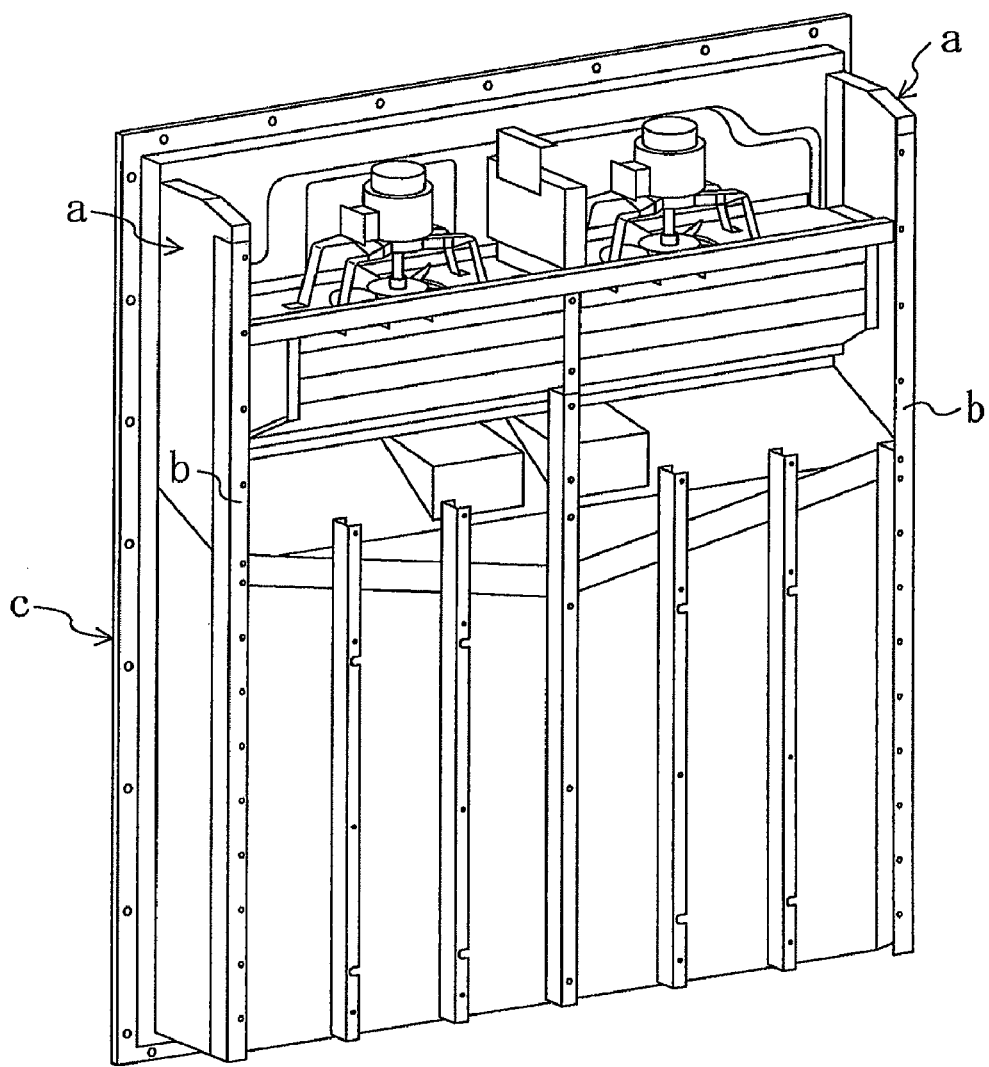

CONTAINER REFRIGERATION UNIT

TECHNICAL FIELD

The present invention relates to a container refrigeration unit, and more particularly to a support structure for a casing.

BACKGROUND ART

Conventionally, there have been container refrigeration units for cooling an interior of a container used in marine transport or other transports.

Patent Document 1 discloses a container refrigeration unit of this type. The container refrigeration unit is provided in an opening of a container body one end of which is opened. In a lower part of a casing of the container, an external storage space communicating with an exterior of a container body is formed. The external storage space contains a compressor, a condenser, and an external fan, for example.

On the contrary, in an upper part of the casing, an internal storage space communicating with an interior of the container body is formed. At a rear surface of the casing, a partition plate is placed upright to partition the interior of the container body and the internal storage space. The partition plate is coupled to and supported by side stays (pillar members) respectively provided at both ends of the casing. In the casing, an air passageway is formed between a casing body partitioning the container into the internal side and the external side thereof, and a partition plate. The internal storage space is provided with an internal fan and an evaporator.

When the container refrigeration unit is operated, internal air is suctioned into the internal storage space by the internal fan. The air is cooled in passing through the evaporator. The cooled air passes through the air passageway, and is sent to the interior of the container again. As described above, the container refrigeration unit is configured to circulate the internal air while cooling the internal air in the air passageway, thereby freezing and refrigerating stored goods in the interior of the container.

CITATION LIST

Patent Document

PATENT DOCUMENT 1: Japanese Patent Application No. H09-24990

SUMMARY OF THE INVENTION

Technical Problem

When a racking load is applied to such a container from a side surface thereof, a stress toward the interior of the container is exerted on the casing body. The casing body might be broken by the stress. As shown in FIG. 8, in a conventional refrigeration unit for a container, side frames (a) are mounted on both edges of an upper portion of a rear surface of a casing body (c), and side stays (b) are mounted on portions each extending from a rear surface of the side frame (a) to a lower portion of the rear surface of the casing body (c). Therefore, even when a racking load is applied to the container, the casing body (c) does not break down since the side stays (b) have a strength. However, this structure provides extra strength against the racking load. The side stay (b) is mounted on a portion extending from the rear surface of the side frame (a) to a lower portion of the rear surface of the casing body (c), thereby causing a problem of increasing a component cost of the side stay (b) at the time of manufacture.

In view of the foregoing, the present invention was developed. The present invention has an object to reduce a component cost of stays, and provide a support structure of a casing having a sufficient strength against a racking load.

Solution to the Problem

The present invention is configured such that, in a support structure of a casing in a container refrigeration unit, stays (50) support side frames (40) from lower sides of thereof.

Specifically, a first aspect of the present invention is directed to a container refrigeration unit attached to a container body (1a). A protruding portion (12) protruding toward the internal side of the container is formed in a lower portion of the casing body partitioning the container into the internal side and the external side thereof. The stays (50) extending in a vertical direction are mounted on both sides of the rear surface of the protruding portion (12) in the casing body (11). Besides, side frames (40) each located above the protruding portion (12) and extending from the casing body (11) to a top end of the stay (50) are mounted on both sides of an upper portion of a rear surface in the casing body (11). In addition, the side frames (40) and the stays (50) are coupled to each other.

In the first aspect of the invention, the stays (50) are mounted on the lower portion of the rear surface of the casing body (11). The stays (50) respectively abut on the side frames (40) mounted on the both sides of the upper portion of the casing body (11). In this state, the stay (50) and the side frame (40) are coupled to each other. Therefore, this structure allows the casing body (11) to deform under a stress exerted on the casing body (11) toward the interior of the container. This reduces the stress exerted on the casing body (11).

According to a second aspect of the invention related to the first aspect of the invention, a bottom tip of the side frame (40) and the top end of the stay (50) are fixed and coupled by a fixing member.

In the second aspect of the present invention, the top end of the stay (50) abuts on the bottom tip of the side frame (40). In this structure, the top end of the stay (50) and the bottom tip of the side frame (40) are fixed by the fixing member. Therefore, this structure ensures that the casing body (11) is allowed to deform under a stress exerted on the casing body (11) toward the interior of the container. As a result, the stress exerted on the casing body (11) is reduced.

According to a third aspect of the invention related to the second aspect of the invention, the top end surface of the stay (50) is formed to be a fixing surface (53) which is horizontally disposed, whereas in the bottom tip of the side frame (40), a fixing surface (43) which is horizontally disposed is formed so as to be in contact with the fixing surface (53) of the stay (50).

In the third aspect of the invention, the fixing surface (53) which is horizontally disposed and is formed in the top end surface of the stay (50) is in contact with the fixing surface (43) which is horizontally disposed and is formed at the bottom tip of the side frame (40). The stay (50) supports the side frame (40) through the fixing surfaces (43, 53) from the lower side of the side frame (40).

According to a fourth aspect of the invention related to the third aspect of the invention, the fixing member includes one or more bolts for fixing the side frame (40) and the stay (50), while the fixing surface (43) of the side frame (40) and the fixing surface (53) of the stay (50) are in contact with each other.

In the fourth aspect of the invention, the fixing surface (43) of the side frame (40) is fixed to the fixing surface (53) of the stay (50) by one or more bolts, while the fixing surface (43) of the side frame (40) and the fixing surface (53) of the stay (50) are in contact with each other. With this structure, the side frame (40) and the stay (50) are fixed to each other, while the stay (50) supports the side frame (40) from the lower side thereof.

According to a fifth aspect of the invention related to the fourth aspect of the invention, a single one of the bolts is provided.

In the fifth aspect of the invention, the side frame (40) and stay (50) are fixed by the single one of the bolts, thereby providing flexibility in a direction in which the bolt rotates around an axis thereof. Since the flexibility is imparted, the casing body (11) is allowed to deform, and the stay (50) is prevented from breaking down.

According to a sixth aspect of the invention related to any one of second to fifth aspects of the invention, a sealing member (64) is provided between the fixing surface (43) of the side frame (40), and the fixing surface (53) of the stay (50).

In the sixth aspect of the invention, the sealing member (64) is provided in a contact portion between the fixing surface (43) of the side frame (40), and the fixing surface (53) of the stay (50). This structure can seal a space occurring between the fixing surface (43) of the side frame (40), and the fixing surface (53) of the stay (50). As a result, air or water can be prevented from leaking from the interior of the casing.

According to a seventh aspect of the invention related to the sixth aspect of the invention, the sealing member (64) is an elastic body.

In the seventh aspect of the invention, the sealing member (64) has elastic properties, thereby providing flexibility in a longitudinal direction of the stay (50), for example, in the axial direction of the bolt in the sixth aspect of the invention. Since the flexibility is imparted, this ensures that the casing body (11) is allowed to deform.

Advantages of the Invention

According to the present invention, the divided stays (50) are mounted on the both ends of the lower portion of the rear surface of the casing body (11). The divided stay (50) supports and fixes the side frame (40) from the lower side thereof. In other words, when a racking load is applied, the casing body (11) deforms toward the interior of the container under a stress exerted on the casing body (11) toward the interior of the container. This reduces the stress exerted on the casing body (11) toward the interior of the container. As a result, the casing body (11) has a sufficient strength against the racking load. On the contrary, compared to conventional stays, the stay (50) of the present invention is divided, thereby decreasing the length of the stay (50) in the longitudinal direction thereof. As a result, a component cost of the stay (50) can be reduced.

According to the second aspect of the invention, the bottom tip of the side frame (40) and the top end of the stay (50) are fixed. Therefore, when a racking load is applied, the casing body (11) surely deforms toward the interior of the container under a stress exerted on the casing body (11) toward the interior of the container. This reduces the stress exerted on the casing body (11) toward the interior of the container.

According to the third aspect of the invention, the fixing surface (53) which is horizontally disposed is formed at the top end surface of the stay (50). Also, the fixing surface (43) which is horizontally disposed is formed at the bottom tip of the side frame (40). Therefore, the stay (50) can be mounted by bringing the fixing surface (53) in the top end surface of the stay (50) into contact with the fixing surface (43) of the bottom tip of the side frame (40). With this structure, the stays (50) can support the side frame (40) from the lower side thereof.

According to the fourth aspect of the invention, the contact portion between the fixing surface (43) of the side frame (40), and the fixing surface (53) of the stay (50) is fixed by the bolt. Therefore, the stay (50) and the side frame (40) can be fixed, while the stay (50) supports the side frame (40) from the lower side thereof.

According to the fifth aspect of the invention, the side frame (40) and the stay (50) are fixed by the single one of the bolts, thereby providing flexibility in a direction in which the bolt rotates around an axis thereof. As a result, the casing body (11) is allowed to deform, and the stays (50) is prevented from breaking down.

According to the sixth aspect of the invention, the sealing member (64) is provided between the fixing surface (43) of the side frame (40), and the fixing surface (53) of the stay (50). Therefore, this structure can prevent a space from occurring in a contact portion between the fixing surface (43) of the side frame (40), and the fixing surface (53) of the stay (50). As a result, air or water can be prevented from leaking from the interior of the casing (10).

According to the seventh aspect of the invention, the sealing member (64) has elastic properties, thereby providing flexibility in the longitudinal direction of the stay (50), for example, in the axial direction of the bolt in the sixth aspect of the invention. Since the flexibility is imparted, thereby ensuring that the casing body (11) is allowed to deform.

BRIEF DESCRIPTION OF THE DRAWINGS

FIG. 8 is a perspective schematic view of a container refrigeration unit according to the prior art, as seen from the internal side of the container.

Figure 1:
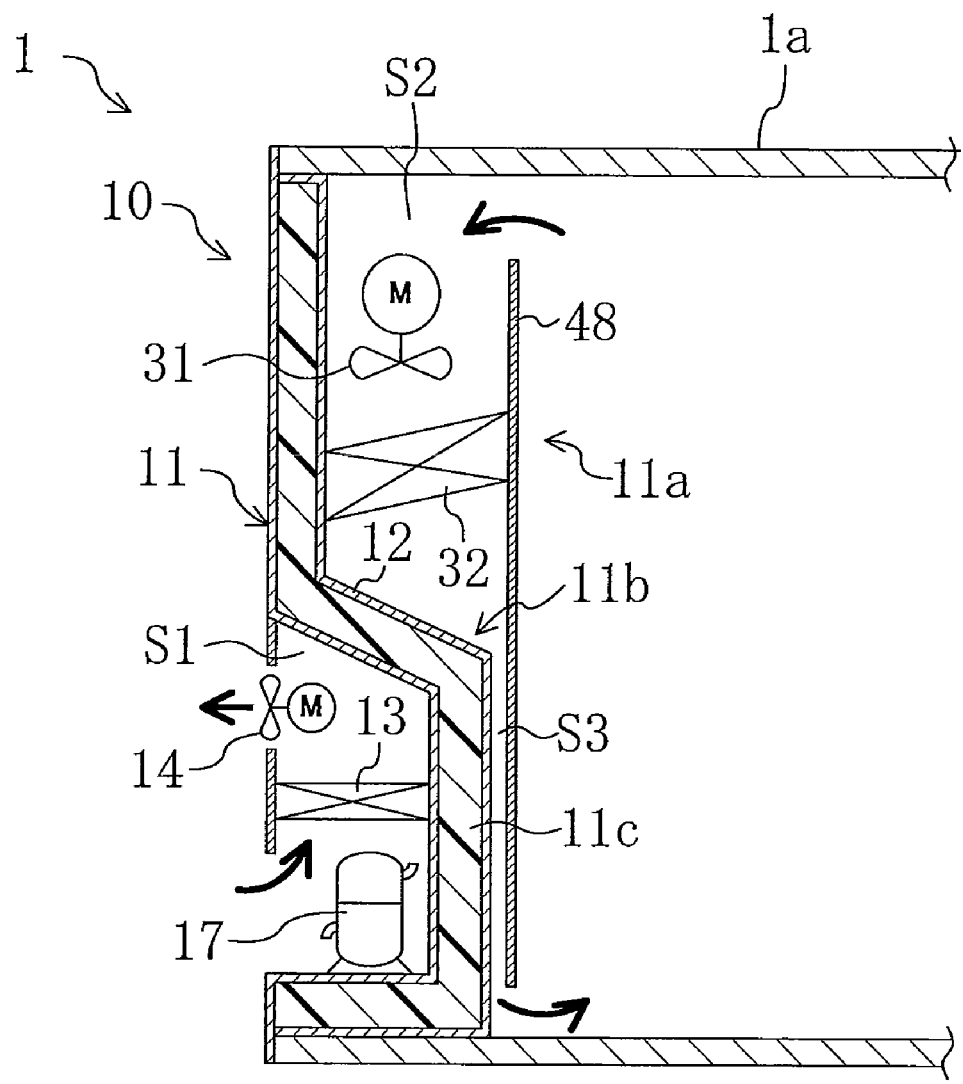
FIG. 1 is a longitudinal sectional view of a container refrigeration unit and a container body according to an embodiment of the present invention.

DESCRIPTION OF REFERENCE CHARACTERS 1a container body
11 casing body
12 protruding portion
40 evaporator frame
43 fixing flange
50 side stay 53 fixing piece
64 sealing member

DESCRIPTION OF EMBODIMENTS

An embodiment of the present invention will be described in detail hereinafter with reference to the accompanying drawings.

Figure 2:
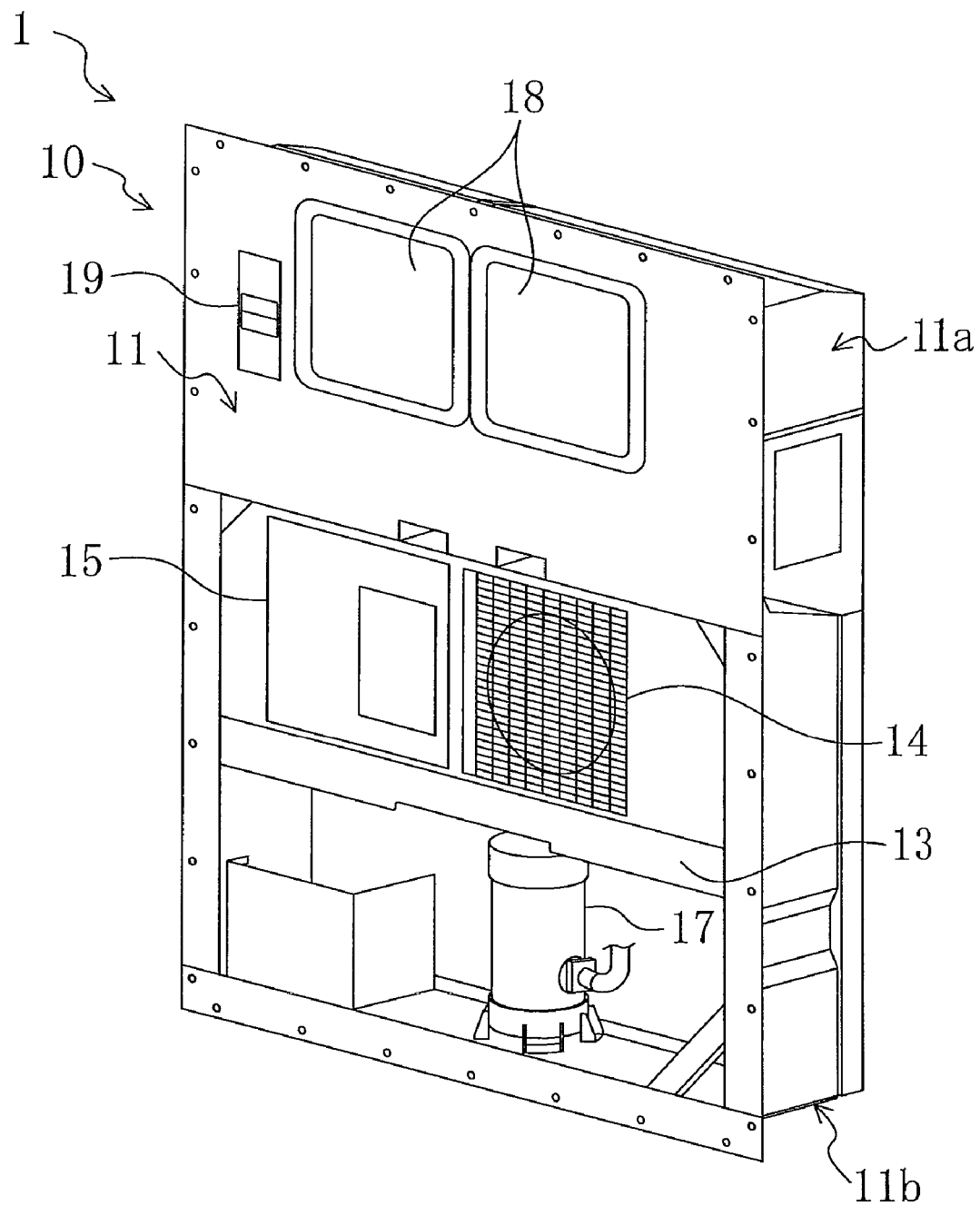
FIG. 2 is a perspective schematic view of the container refrigeration unit according to an embodiment of the invention, as seen from the exterior of the container.

As shown in FIGS. 1 and 2, a container refrigeration unit (1) cools an interior of a container used in marine transport or other transports. The container refrigeration unit (1) includes a refrigerant circuit provided with a compressor (17), a condenser (13), and an evaporator (32) to operate a refrigeration cycle.

A casing (10) of the container refrigeration unit (1) includes a casing body (11) partitioning the container into the internal side and the external side thereof, and a partition plate (48) provided on a rear surface (the internal side) of the casing (10).

The casing body (11) has a dual structure of an internal casing (11a) made of aluminum, and an external casing (11b) made of FRP. A thermal insulating layer (11c) made of a foaming agent is formed between the internal casing (11a) and the external casing (11b).

Further, in a lower portion of the casing body (11), a protruding portion (12) protruding toward the internal side of the container is formed. The interior of the protruding portion (12) is formed to be an external storage space (S1), whereas an internal storage space (S2) located above the protruding portion (12) is formed in an upper portion of the rear surface of the casing (10).

In the external storage space (S1), the compressor (17), the condenser (13), an external fan (14), and an electrical component box (15) are contained, whereas an evaporator (32), and an internal fan (31) are contained in the internal storage space (S2).

In the upper portion of the casing (11), an inspection window (18) and a ventilator (19) are provided.

Figure 3:
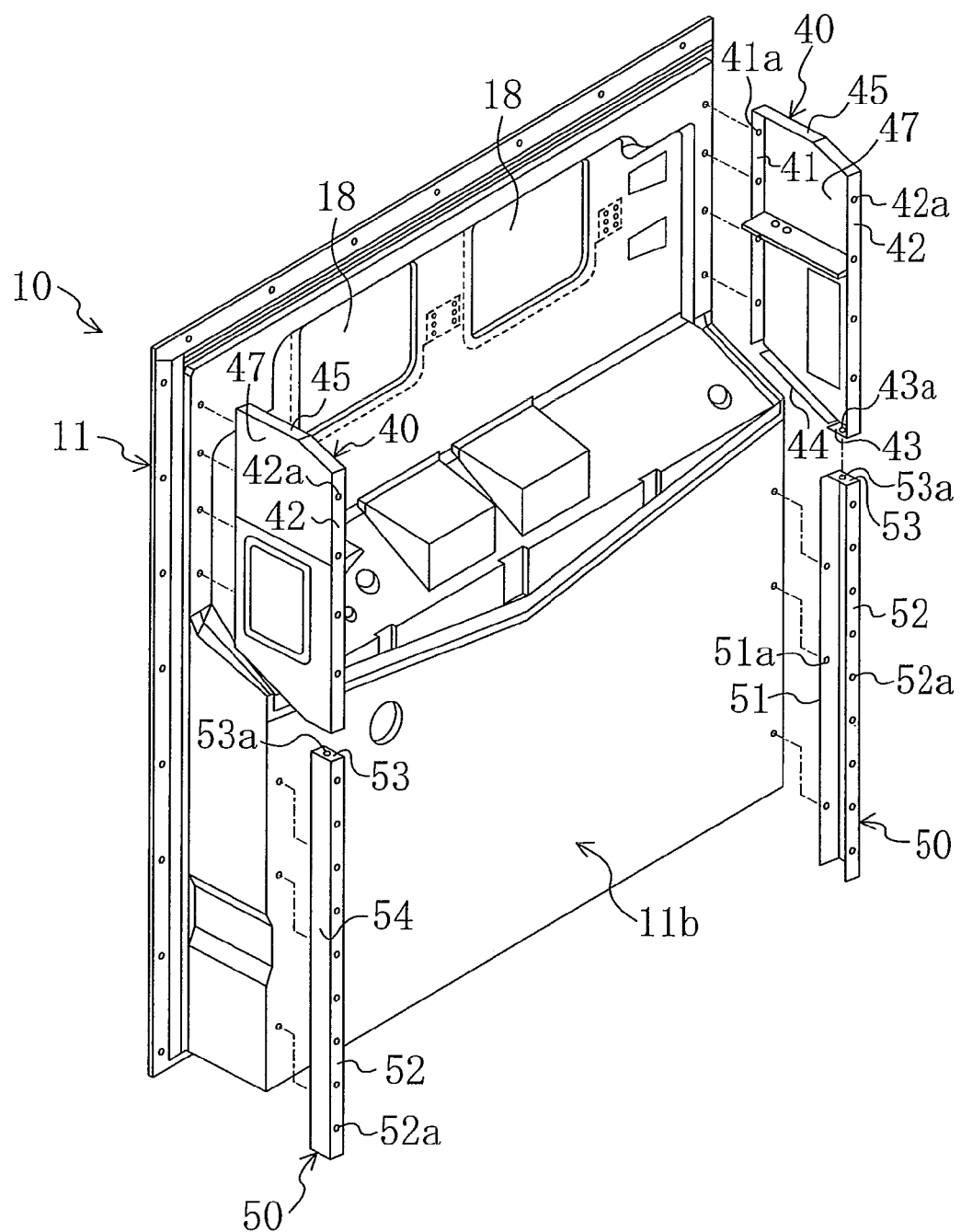
FIG. 3 is an exploded view showing a structure of a casing according to the embodiment of the invention.

As shown in FIG. 3, the side stays (50) are provided at both sides of the rear surface of the protruding portion (12) in the casing (11), whereas evaporator frames (40) serving as side frames are provided at both sides of the upper portion of the rear surface (the internal side) of the casing body (11).

The side stay (50) which characterizes the invention is formed to have a length extending from a bottom end of the casing body (11) to a top end of the protruding portion (12) and a bottom end of the evaporator frame (40). In other words, the stay (50) is configured to be shorter than conventional stays, and to be separated from the frame (40).

Specifically, the side stay (50) is formed by bending mounting pieces (51, 52) respectively located at the front and back sides of a main plate (54) extending vertically. The mounting pieces (51, 52) are formed so as to have a U-shape in horizontal cross-section, and a fixing piece (53) is formed at top ends thereof. A plurality of bolt holes (51a, 52a) are formed at the mounting pieces (51, 52). The one mounting piece (51) is mounted on the rear surface of the protruding portion (12) by the bolt, and the other mounting piece (52) is mounted on a partition plate (48) by the bolt.

The fixing piece (53) includes a bolt hole (53a), and is horizontally formed to close the top end of the side stay (50). The upper surface of the fixing piece (53) is formed to be a fixing surface which is horizontally disposed.

On the contrary, the evaporator frame (40) which forms the internal storage space (S2) extends from the rear surface of the casing body (11) toward the internal side. The evaporator frame (40) is formed by a sheet metal member made of aluminum, where a top flange (45), a bottom flange (44), a front flange (41), a rear flange (42), and a fixing flange (43) located around a frame body (47) are bent inwardly.

A length of the frame body (47) in a front to back direction is identical with a length from the rear surface of the casing body (11) to a rear surface of the side stay (50), whereas a length of the frame body (47) in a vertical direction is identical with a length from the top end of the casing body (11) to the upper surface of the protruding portion (12).

A plurality of bolt holes (41a, 42a) are formed in the front flange (41) and the rear flange (42). The front flange (41) is mounted on the rear surface of the casing body (11) by the bolt, and the partition plate (48) is mounted on the rear flange (42) by the bolt.

The bottom end of the frame body (47) and the bottom flange (44) are formed along the upper surface of the protruding portion (12), and are inclined downwardly toward the rearward that is the internal side.

Figure 4:
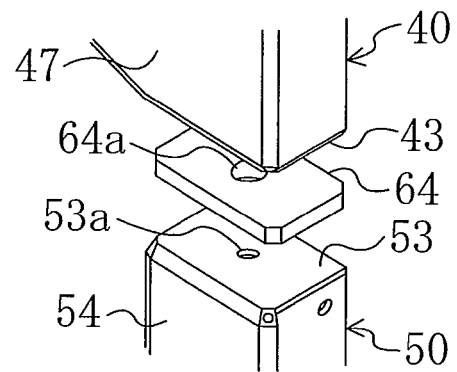
FIG. 4 is an exploded view showing the mounting of a sealing member according to the embodiment of the invention.

As shown in FIG. 4, the fixing flange (43) is formed at the rear end of the frame body (47) which is the bottom end of the frame body (47) and located in the internal side. The fixing flange (43) includes a bolt hole (43a), and the lower surface of the fixing flange (43) is formed to be a fixing surface which is horizontally deposited, according to the fixing piece (53) of the side stay (50). The fixing flange (43) is integrally formed with the fixing piece (53) of the side stay (50) by the bolt.

In other words, the bottom tip of the evaporator frame (40) and the top end of the side stay (50) are fixed by the one bolt which serves as a fixing member, so that the evaporator frame (40) and the side stay (50) are coupled to each other.

Figure 5:
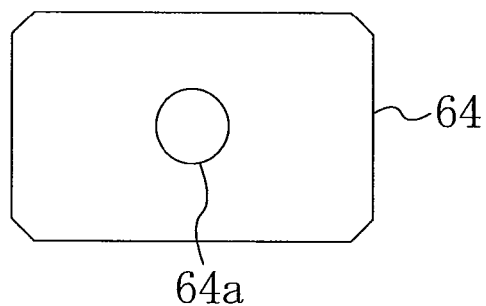
FIG. 5 is a schematic view showing the sealing member according to the embodiment of the invention.

A sealing member (64) is provided between the fixing flange (43) of the evaporator frame (40), and the fixing piece (53) of the side stay (50). As shown in FIG. 5, the sealing member (64) has substantially the same shape as the fixture surface formed in the fixing flange (43). The sealing member (64) is formed by an elastic body, thereby preventing air or water from leaking from the interior of the internal casing (11a).

Figure 6:
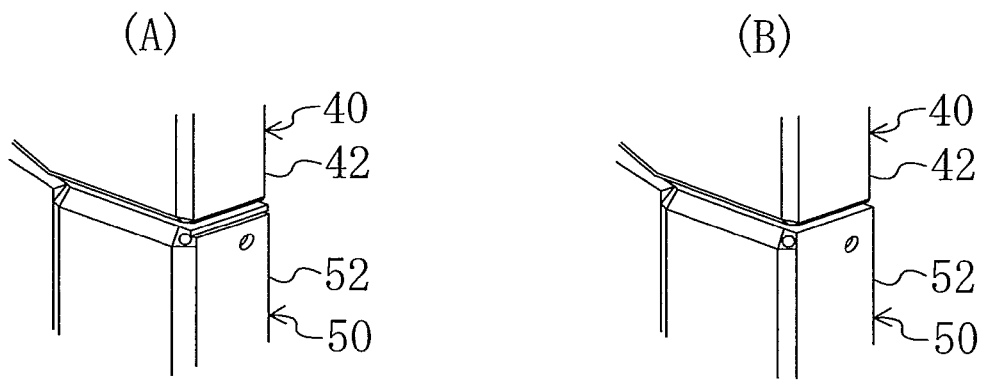
FIG. 6A is a schematic view showing an example of a connection of evaporator frames and side stays.
FIG. 6B is a schematic view showing a connection of evaporator frames and side stays according to the present invention.

As shown in FIG. 6A, when the side stay (50) is divided, a space is formed in the mounting piece (52) at the internal side. The air or water in the internal storage space (S2) leaks from this space. However, in the embodiment, as shown in FIG. 6B, the top end of the mounting piece (52) located in the internal side is extended upwardly to seal the space. This structure prevents the air or water from leaking from the interior of the internal casing (11a).

Figure 7:
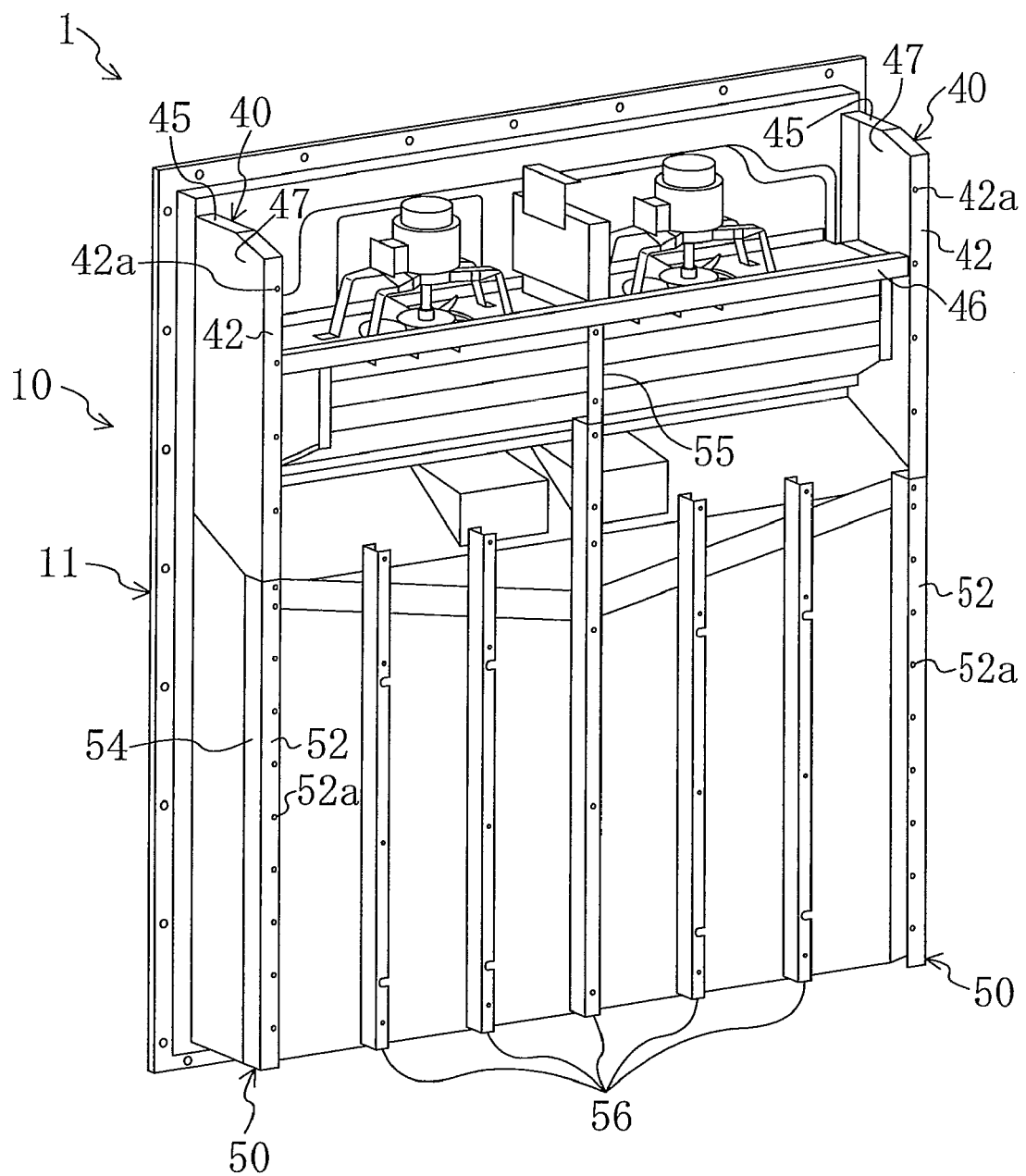
FIG. 7 is a perspective schematic view of the container refrigeration unit according to the embodiment of the invention, as seen from the internal side of the container.

Also, as shown in FIG. 7, the evaporator frames (40) located at right and left sides are coupled by a coupling member (46), whereas a plurality of sub stays (56) each extending vertically are mounted on the rear surface of protruding portion (12) of the casing body (11). The top end of the middle sub stay (56) located at the middle portion is coupled to the coupling member (46) through an auxiliary member (55).

The partition plate (48) is formed to be a piece of plate, and is mounted on the side stays (50), the evaporator frames (40), and the sub stays (56) so as to cover the rearward of the casing body (11). In the upper portion of the protruding portion (12) of the casing body (11), the internal storage space (S2) is arranged with the evaporator frame (40) and the partition plate (48), whereas a space between protruding portion (12) and the partition plate (48) is configured to be an air passageway (S3). The top end of the air passageway (S3) is communicated with the internal storage space (S2), whereas the bottom end of the air passageway (S3) is communicated with the interior of the container.

Running Operation

The operation of the container refrigeration unit (1) is started by driving the compressor (17), the external fan (14), and the internal fan (31). In the refrigerant circuit of the container refrigeration unit (1), a suction refrigerant of the compressor (17) is sent to the condenser (13). In the condenser (13), heat of the refrigerant is taken as heat of an external air sent by the external fan (14). As a result, the refrigerant dissipates the heat into the external air, and is condensed.

The refrigerant condensed in the condenser (13) is sent to the evaporator (32) after being depressed by an expansion valve. In the evaporator (32), heat of the refrigerant is taken as heat of an external air sent by the internal fan (31). As a result, the refrigerant evaporates by absorbing the heat from the internal air, thereby cooling the internal air.

Next, an operation when a racking load is applied will be described as indicated below.

When a racking load is applied from a side direction in the exterior of the container refrigeration unit (1), a stress occurs in the container refrigeration unit (1), where the stress is exerted on the casing body (11) toward the interior of the container. A conventional unit has the side stays mounted from the lower portion of the rear surface of the evaporator frame to the lower portion of the rear surface of the casing body, and it has a strength against the stress. Therefore, the casing body does not break down. However, in the embodiment of the invention, the side stays (50) are formed separately from the frames (40) and attached to them, and the casing body (11) deforms toward the interior of the container under a stress exerted on the casing body (11) toward the interior of the container. This reduces the stress exerted on the casing body (11) toward the interior of the container.

Advantages of Embodiment

According to the embodiment of the invention, the divided side stays (50) are mounted on the both ends of the lower rear surface of the casing body (11). The divided side stay (50) supports the evaporator frame (40) from the lower side thereof, and is fixed by the bolt. Therefore, when a racking load is applied, the casing body (11) deforms toward the interior of the container under a stress exerted on the casing body (11) toward the interior of the container. This reduces the stress exerted on the casing body (11) toward the interior of the container. As a result, the casing body (11) has a sufficient strength against the racking load. On the contrary, compared to conventional stays, the side stay (50) of the present invention is divided, thereby decreasing the length of the side stay (50) in the longitudinal direction thereof. As a result, a component cost of the side stay (50) can be reduced.

Also, the bottom tip of the evaporator frame (40) and the top end of the side stay (50) are fixed. Therefore, when a racking load is applied, the casing body (11) surely deforms toward the interior of the container under a stress exerted on the casing body (11) toward the interior of the container. This reduces the stress toward the interior of the casing body (11) toward the interior of the container.

Also, the fixing surface (53) which is horizontally disposed is formed at the top end of the stay (50). The fixing surface (43) which is horizontally disposed is formed at the bottom tip of the side frame (40). Therefore, the stay (50) can be mounted by bringing the fixing surface (53) in the top end surface of the stay (50) into contact with the fixing surface (43) of the bottom tip of the side frame (40). With this structure, the stay (50) can support the side frame (40) from the lower side thereof.

In addition, the contact portion connecting the fixing surface (43) of the evaporator frame (40) and the fixing surface (53) of the side stay (50) are fixed by the bolt. Therefore, the side stay (50) and the evaporator frame (40) can be fixed while the side stay (50) supports the evaporator frames (40) from the lower side thereof.

Also, the evaporator frame (40) and the side stay (50) are fixed by the single one of the bolts, thereby providing flexibility in a direction in which the bolt rotates around an axis thereof. As a result, the casing body (11) is allowed to deform, and the side stay (50) is prevented from breaking down.

Also, the sealing member (64) is provided between the fixing surface (43) of the side frame (40), and the fixing surface (53) of the side stay (50). Therefore, this structure can prevent a space from occurring in the contact portion between the fixing surface (43) of the side frame (40), and the fixing surface (53) of the side stay (50). As a result, air or water can be prevented from leaking from the interior casing (10a).

Also, the sealing member (64) has elastic properties, thereby providing flexibility in the longitudinal direction of the side stay (50), for example, in the axial direction of the bolt. Since the flexibility is imparted, thereby ensuring that the casing body (11) is allowed to deform.

Other Embodiment

The above-described embodiments of the invention may be modified as described below.

In the embodiment, the present invention applies to the support structure of the casing (10) of the container refrigeration unit (1). The present invention is also applicable to a support structure in other units and the like.

The foregoing embodiment is merely a preferred example in nature, and is not intended to limit the scope, applications, and use of the invention.

INDUSTRIAL APPLICABILITY

As described above, the present invention is useful for a support structure of a casing in a container refrigeration unit.

The invention claimed is:

1. A container refrigeration unit mounted on a container body, comprising:
   a protruding portion protruding toward an internal side is formed in a lower portion of a casing body partitioning the container into an internal side and an external side thereof;
   stays each extending in a vertical direction mounted on both sides of the rear surface of the protruding portion in the casing body; and
   side frames each located above the protruding portion and extending from the casing body to a top end of the stay are mounted on both sides of an upper portion of a rear surface in the casing body, wherein
   the bottom tip of the side frame and the top end of the stay are fixed by a fixing member, thereby coupling the side frame to the stay.

2. The unit of claim 1, wherein
   the top end surface of the stay is formed to be a fixing surface which is horizontally disposed, and
   in the bottom tip of the side frame, a fixing surface which is horizontally disposed is formed so as to be in contact with the fixing surface of the stay.

3. The unit of claim 2, wherein
the fixing member includes one or more bolts for fixing the side frame and the stay, while the fixing surface of the side frame and the fixing surface of the stay are in contact with each other.

4. The unit of claim 3, wherein
a single one of the bolts is provided.

5. The unit of any one of claims 2 and 4, wherein
a sealing member is provided in a contact portion between the fixing surface of the side frame, and the fixing surface of the stay.

6. The unit of claim 5, wherein
the sealing member is an elastic body.

* * * * *